United States Patent
Mukaidani et al.

[11] Patent Number: 5,992,394
[45] Date of Patent: Nov. 30, 1999

[54] FUEL SUPPLY DEVICE HOUSING PUMP AND FILTER IN SUB-TANK

[75] Inventors: Akiyoshi Mukaidani, Takahama; Kunihiro Umetsu, Kariya, both of Japan

[73] Assignee: Denso Corporation, Japan

[21] Appl. No.: 09/129,895

[22] Filed: Aug. 6, 1998

[30] Foreign Application Priority Data

Sep. 30, 1997 [JP] Japan ................................... 9-265699

[51] Int. Cl.⁶ .................................................. F02M 37/04
[52] U.S. Cl. ......................... 123/509; 123/514; 137/576
[58] Field of Search ................................. 123/509, 510, 123/514, 516; 137/576, 572, 574

[56] References Cited

U.S. PATENT DOCUMENTS

| | | | |
|---|---|---|---|
| 4,747,388 | 5/1988 | Tuckey | 123/514 |
| 4,807,582 | 2/1989 | Tuckey | 137/572 |
| 4,928,657 | 5/1990 | Asselin | 137/576 |
| 4,974,570 | 12/1990 | Szwargulski | 123/514 |
| 5,341,842 | 8/1994 | Chih | 137/576 |
| 5,560,342 | 10/1996 | Fournier | 123/576 |
| 5,649,514 | 7/1997 | Okada et al. | |
| 5,769,061 | 6/1998 | Nagata | 123/509 |
| 5,782,223 | 7/1998 | Yamashita | 123/510 |

FOREIGN PATENT DOCUMENTS 3-67058  3/1991  Japan .

Primary Examiner—Carl S. Miller
Attorney, Agent, or Firm—Nixon & Vanderhye P.C.

[57] ABSTRACT

A fuel supply device for an engine has a pump module comprising a fuel pump and a fuel filter. The pump module is housed within a sub-tank mounted in a fuel tank. The fuel filter is shaped arcuately in section and fitted around the outer circular periphery of the fuel pump. The sub-tank has a concave space on its outer periphery. The concave space and its above space accommodate therein a part of electrical connector, a fuel level gauge, electrical lead wires for the electrical connector and the fuel level gauge, a jet pump and a connecting pipe for the jet pump and a fuel return port. This arrangement reduces the diameter of the fuel supply device and facilitates mounting work of the fuel supply device in a limited space in the fuel tank.

11 Claims, 3 Drawing Sheets

FUEL SUPPLY DEVICE HOUSING PUMP AND FILTER IN SUB-TANK

CROSS REFERENCE TO RELATED APPLICATION

This application relates to and incorporates herein by reference Japanese Patent Application No. 9-265699 filed on Sep. 30, 1997.

BACKGROUND OF THE INVENTION

1. Field of the Invention

The present invention relates to a fuel supply device which houses a fuel pump and a fuel filter in a sub-tank and is mounted within a fuel tank for an internal combustion engine.

2. Related Art

As a fuel supply device, JP-A 3-67058 proposes one type which houses a fuel pump within a sub-tank to maintain fuel in the sub-tank and enable the fuel pump to suck the fuel even when fluid in a main fuel tank decreases.

This type of fuel supply device is required to be as compact in size as possible to meet a recent trend to reduce in size any component parts mounted in a vehicle. Particularly when the main fuel tank is made of resin, the main fuel tank should have a sub-tank mounting hole as small as possible not to lower the rigidity and sealing performance of the fuel tank. Thus, the fuel supply device including the sub-tank and other component parts arranged outside of the sub-tank should be reduced in size as much as possible for facilitating mounting of the same through the sub-tank mounting hole, without reducing a volume of the sub-tank. Further, more component parts should be integrated into a module to facilitate assembling of the fuel supply device.

SUMMARY OF THE INVENTION

It is an object of the present invention to provide a fuel supply device which is suitable for facilitating assembling a fuel pump and a fuel filter to a sub-tank and mounting in a limited space in a fuel tank.

According to the present invention, a fuel filter is assembled on an outer periphery of a fuel pump. A generally cylindrical sub-tank houses an assembly of the fuel filter and the fuel pump therein to be mounted in a main fuel tank. The sub-tank has a concave space at an outer periphery thereof. The concave space houses therein some component parts which are to be mounted within the fuel tank but arranged radially outside of the sub-tank. This enables integration of as many component parts as possible as a module and reduces the module in size in a radial direction, thereby reducing a mounting hole of the fuel tank in size and facilitating mounting of the sub-tank into the fuel tank.

Preferably, the fuel filter has an annular or arcuate shape in section to be fitted tightly around the outer circumferential periphery of the fuel pump.

BRIEF DESCRIPTION OF THE DRAWINGS

Other objects, features and advantages of the present invention will become more apparent from the following detailed description and the accompanying drawing. In the drawings.

DETAILED DESCRIPTION OF THE PREFERRED EMBODIMENT

A fuel supply device according to the present invention will be described in detail with reference to various embodiments.

First Embodiment

Figure 1:
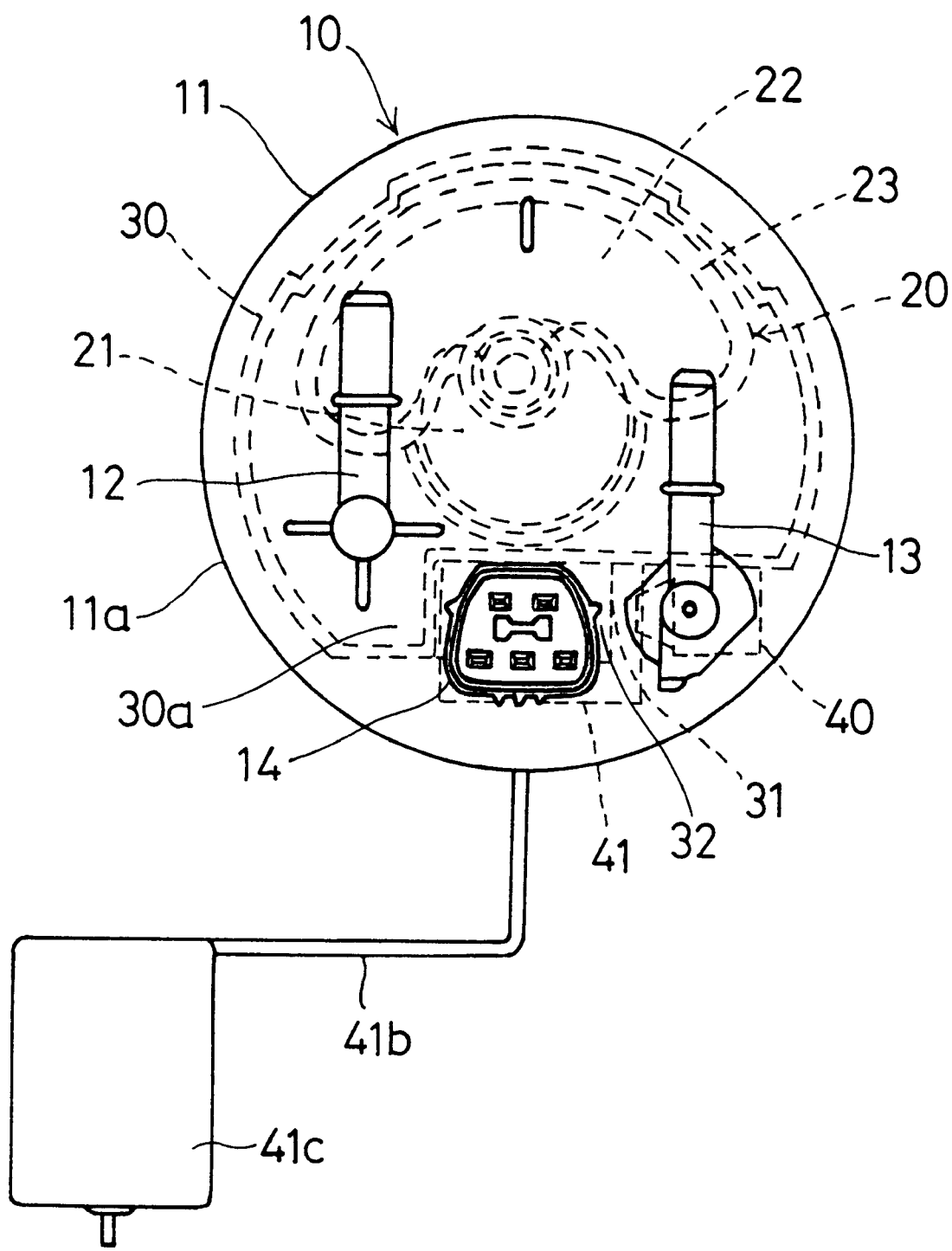
FIG. 1 is a plan view showing a fuel supply device according to a first embodiment of the present invention.
Figure 2:
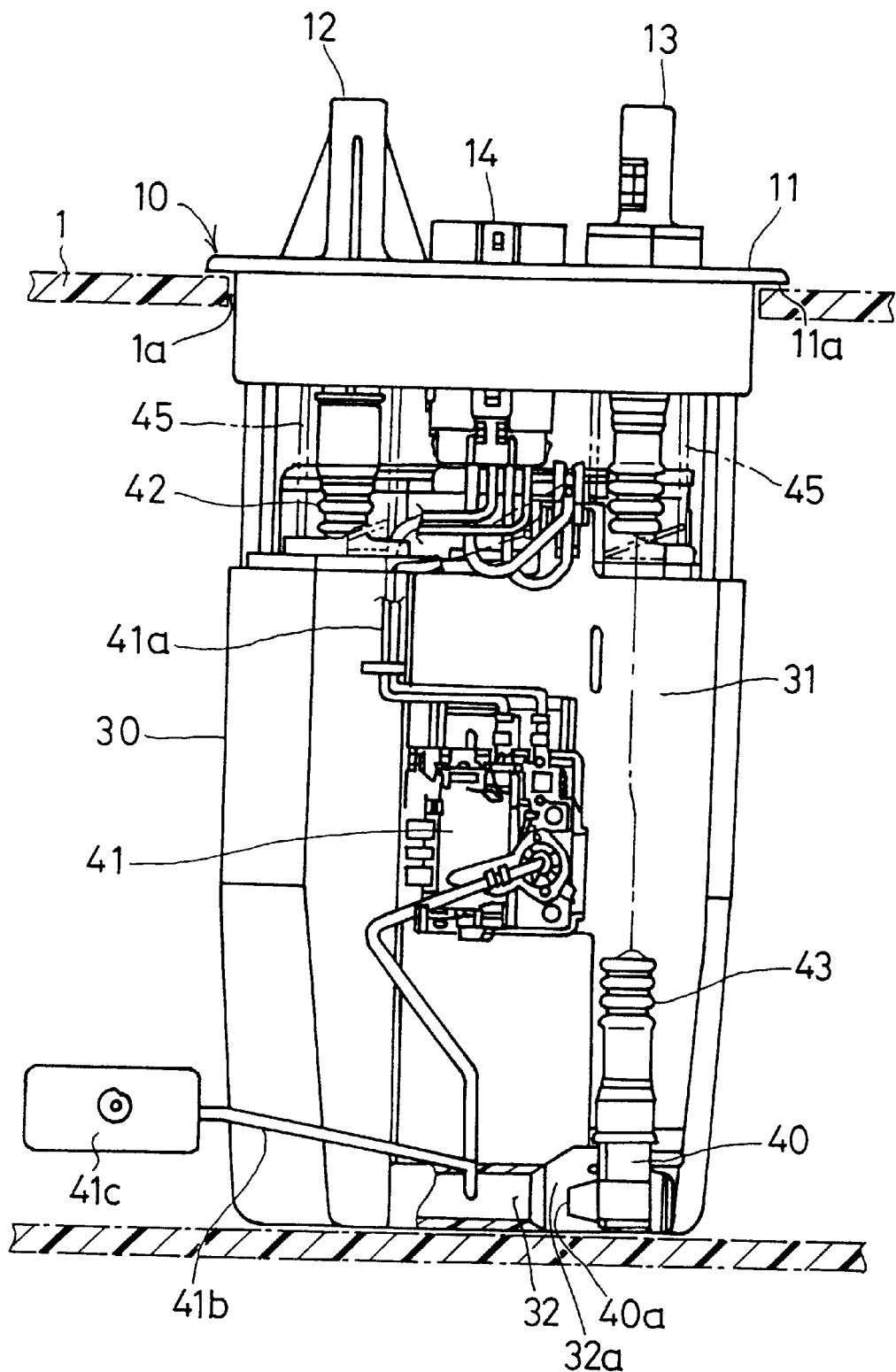
FIG. 2 is a side view showing the fuel supply device according to the first embodiment shown in FIG. 1.

As shown in FIGS. 1 and 2, a fuel supply device 10, which is mounted in a main fuel tank of an internal combustion engine (not shown), has a flange 11 made of resin and a sub-tank 30 made of resin. The flange 11 has an engagement part 11a at its outer circumferential periphery. When the fuel supply device 10 is mounted inside the fuel tank 1 made of resin, the flange 11 closes a mounting hole 1a of the fuel tank 1 with its engagement part 11a being engaged with the top wall of the fuel tank 1. The mounting hole 1a has a diameter larger than that of the sub-tank 30 but smaller than that of the engagement part 11a. The flange 11 and the sub-tank 30 are assembled movably in the axial direction while being restricted from separating each other in the axial direction. Coil springs 45 disposed between the flange 11 and the sub-tank 30 bias the same in axially opposite directions. Thus, under the condition that the fuel supply device 10 is mounted in the fuel tank 1, the coil springs 45 press the bottom of the sub-tank 30 to the bottom wall of the fuel tank 1. The coil springs 45 maintain the contact between the bottom of the sub-tank 30 and the bottom wall of the fuel tank 1, even when the fuel tank 1 expands and contracts due to changes in temperature or pressure in the fuel tank 1.

The flange 11 is molded by resin integrally with a fuel discharge port 12, a return fuel port 13 and an electrical connector 14. The discharge port 12, return port 13 and electrical connector 14 may be separate pieces and assembled with the flange 11 integrally. The discharge port 12 is for discharging fuel supplied from the fuel pump 21 to the outside of the fuel tank 1, that is, to an engine side, while the return port 13 returns excess fuel from the engine side into the fuel tank 1. The return port 13 is connected with a jet pump 40 disposed at the bottom level of the sub-tank 30 through a bellows-type connecting pipe 43. The electrical connector 14 is for supplying a motor driving current for the fuel pump 21 and for supplying electrical signal of a fuel level gauge 41.

A fuel filter 22 is assembled with the fuel pump 21 within a module casing 23 to provide a single pump module 20. The module casing 23 is shaped arcuately in section. The sub-tank 30 houses the pump module 20 therein with the outer cylindrical wall surface of the module casing 23 being in contact with the inner cylindrical wall surface of the sub-tank 30.

The fuel filter 22 is shaped arcuately in section and mounted on a part of the outer cylindrical peripheral surface of the fuel pump 21. A bellows-type connecting pipe 42 connects the fuel filter 22 to the discharge port 12. The connecting pipe 42 passes a space within the sub-tank 30 where the pump module 20 does not exist, that is, a space between the sub-tank 30 and the pump module 20.

The sub-tank 30 is shaped generally cylindrically but has two transversely crossing walls which define a concave space 31 at an outside of the crossing walls. The crossing walls extend in the axial direction of the sub-tank 30 to provide the concave space 31 in the axial direction. In-tank part of the electrical connector 14, a fluid level gauge 41, electrical lead wires 41a connecting the fluid level gauge 41 and the electrical connector 14, the jet pump 40, the connecting pipe 43 and the fuel inlet 32 for receiving the return fuel from the jet pump 40 and accompanying fuel are disposed within the concave space 31 of the sub-tank 30 and a space existing above the concave space 31. Thus, those component parts are also disposed within the fuel tank 1 together with the pump module 20 but disposed radially outside of the sub-tank 30.

The fuel level gauge 41 is operatively coupled with a float 41c through an arm 41b. The arm 41b and float 41c are disposed radially outside of the outer circular periphery of the sub-tank 30. In mounting the fuel supply device 10 into the fuel tank 1 through the mounting hole 1a, the arm 41b and the float 41c may be inserted first while maintaining the fuel supply device 10 inclined.

The jet pump 40 has a jet nozzle 40a directed to a fuel inlet 32 provided at the bottom of the sub-tank 30. The jet nozzle 40a jets the excess fuel returned through the return port 13 and the connecting pipe 43 into the fuel inlet 32. This jetting generates a pressure reduction in the fuel inlet 32. Thus, the fuel in the fuel tank 1 is forced to flow into the sub-tank 30 through the fuel inlet 32. The sub-tank 30 has an inside space 30a adjacent to the concave space 31. This inside space maximizes the fuel storage space of the sub-tank 30 even under the condition that the sub-tank 30 is shaped to have the concave space 31 partly at the radial outside thereof.

The fuel inlet 32 is disposed is disposed closely to the jet pump 40 with a small vapor discharging spacing 32a. Even when the fuel vaporizes due to the vacuum generated by the jetted fuel from the jet pump 40, the vapor may be discharged upwardly and does not remain nor enter into the sub-tank 30. The bellows-type connecting pipe 43 is deformable to absorb expansion and contraction of the fuel tank 1 which may be caused by temperature-dependent changes in internal pressure and fuel quantity. In this embodiment, the connecting pipe 43 is disposed outside of the sub-tank 30 so that it is enabled to deform when the fuel tank 1 contracts.

In operation, with the motor driving current being supplied to the fuel pump 21 through the electrical connector 14, the fuel pump 21 sucks fuel in the sub-tank 30 and pumps out the pressurized fuel to the fuel filter 22. The fuel filter 22 passes the fuel to the engine side through the connecting pipe 42 and the discharge port 12, while filtering out foreign particles in the fuel.

The excess fuel returns from the engine side to the jet pump 40 through the return port 13 and the connecting pipe 43. The excess fuel is jetted towards the fuel inlet 32, causing the fuel remaining outside of the sub-tank 30 to flow into the sub-tank 30. With the fuel jetting pressure, the fuel in the sub-tank 30 is maintained at an elevated level. Thus, even when the fuel around the inlet port 32 moves away due to vehicle turning or vehicle ascending/descending under the condition that little fuel remains in the fuel tank 1, the fuel pump 21 is capable of pumping out fuel maintained in the sub-tank 30.

As the coil springs 42 bias the sub-tank 30 to seat on the bottom wall of the fuel tank 1, the fuel inlet 32 of the sub-tank 30 is held at the lowermost position in the fuel tank 1. Thus, the fuel pump 21 is enabled to pump out fuel even when the fuel level in the fuel tank 1 falls.

Further, the fuel pump 21 and the fuel filter 22 are housed as the single module unit within the sub-tank 30, and other component parts such as the jet pump 40 and the fuel level gauge 41 are accommodated in the space 31 of the sub-tank 30. Thus, component parts which need to be located radially outside of the generally circular cross sectional configuration of the sub-tank 30 are reduced in number to a minimum. This reduces the fuel supply device 10 in size without limiting the fuel storing volume of the sub-tank 30 too much. Further, the component parts including the jet pump 40, the fuel level gauge 41 and the like which are disposed outside of the sub-tank 30 can be held tightly with the sub-tank 30 by known fixing means. This facilitates assembling of the component parts into a single unit and mounting of the fuel supply device 10 into a limited space in the fuel tank through the mounting hole 1a of the fuel tank 1.

Second Embodiment

Figure 3:
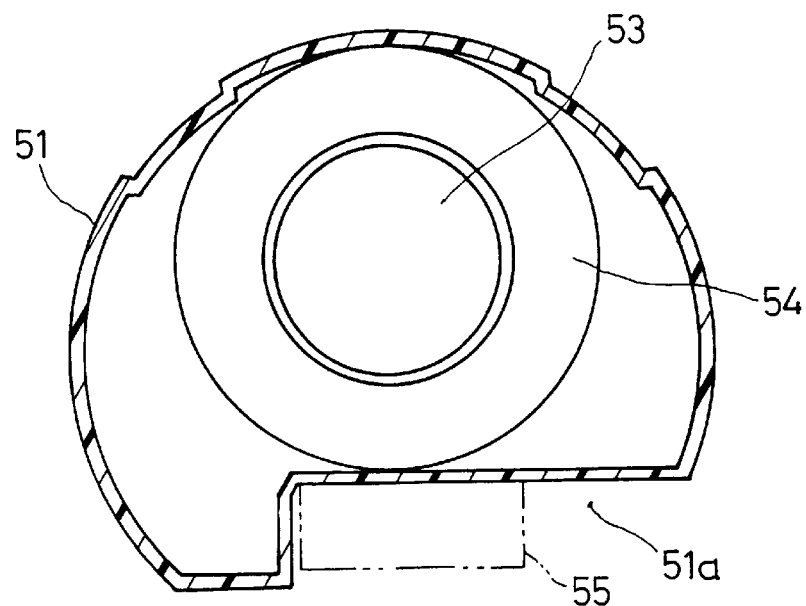
FIG. 3 is a schematic sectional view showing a sub-tank of a fuel supply device according to a second embodiment of the present invention.

In the second embodiment shown in FIG. 3 also, a sub-tank 51 is shaped generally cylindrically, while having a concave space 51a as in the first embodiment. A fuel filter 54 is shaped annularly to surround the entire outer circumferential periphery of a fuel pump 53. Although the fuel pump 53 and the fuel filter 54 are not assembled into a single module, it maybe so. The concave space 51a accommodates therein at least some of component parts 55 such as a jet pump, a fuel level gauge and a cut-off valve which regulates a pressure within a fuel tank, as in the first embodiment.

Third Embodiment

Figure 4:
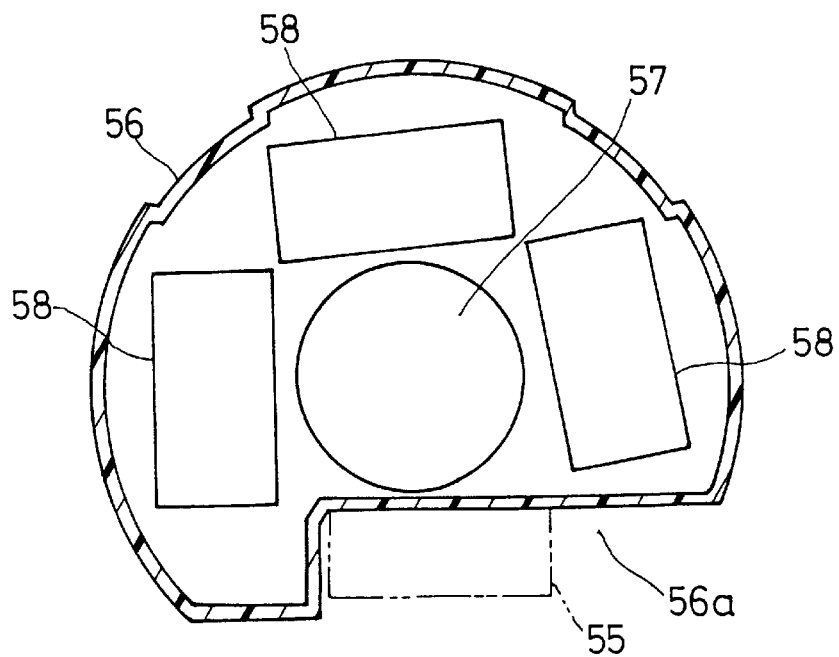
FIG. 4 is a schematic sectional view showing a sub-tank of a fuel supply device according to a third embodiment of the present invention.

In the third embodiment shown in FIG. 4, a fuel supply device has a plurality of fuel filters 58 arranged around a fuel pump 57 in a generally cylindrical sub-tank 56. Each of the fuel filters 58 are shaped rectangularly in section and not integrated with the fuel pump 57 into a single module. The sub-tank 56 is formed with a concave space 56a for accommodating therein at least some of the component parts 55 as in the first and second embodiments.

We claim:

1. A fuel supply device for a fuel tank having a mounting hole, the device comprising:

a sub-tank having a concave space on a part of an outer circumferential periphery thereof:

a fuel pump housed within the sub-tank for sucking and discharging fuel in the sub-tank;

a fuel filter housed within the sub-tank together with the fuel pump for filtering out foreign particles from the discharged fuel, the fuel filter being arranged around an outer circumferential periphery of the fuel pump;

a fuel level gauge disposed in the concave space of the sub-tank outside the sub-tank and having an arm extending radially outside the extended outer circumferential periphery of the sub-tank;

an electrical connector; and a fuel return port held in fluid communication with the fuel pump, wherein at least one of the electrical connector and fuel return port are disposed axially above the concave space of the sub-tank, wherein the fuel filter has inner and outer arcuate circumferential peripheral surfaces; and wherein the fuel pump and the sub-tank have outer and inner circumferential peripheral surfaces which are held in contact with the inner and outer arcuate circumferential peripheral surfaces of the fuel filter, respectively.

2. The fuel supply device as in claim 1, wherein:

the fuel filter is shaped annularly to surround an entire circumference of the outer periphery of the fuel pump.

3. The fuel supply device as in claim 1, wherein:

the fuel filter is shaped arcuately and fitted around only a part of an entire circumference of the outer periphery of the fuel pump.

4. The fuel supply device as in claim 1, wherein:
a jet pump is also disposed in the concave space of the sub-tank outside the sub-tank.

5. The fuel supply device as in claim 1, further comprising:
a flange having a larger diameter than the sub-tank and movably engaged with the sub-tank; and
a spring disposed between the flange and the sub-tank for biasing the sub-tank away from the flange so that the sub-tank is maintained seated on a bottom of the fuel tank.

6. The fuel supply device as in claim 1, further comprising:
a fuel return connecting pipe disposed in the concave space; and
a jet pump connected to the fuel return connecting pipe and disposed in the concave space for jetting return fuel into the sub-tank.

7. The fuel supply device as in claim 1, further comprising:
a fuel discharge connecting pipe disposed outside of the fuel pump and within the sub-tank.

8. The fuel supply device as in claim 7, further comprising:
a fuel return connecting pipe disposed in the concave space; and
a jet pump connected to the fuel return connecting pipe and disposed in the concave space at a bottom level of the sub-tank for jetting return fuel into the sub-tank.

9. A fuel supply device as in claim 1 wherein the sub-tank has a flat wall to define the concave space and the fuel level gauge is attached to the flat wall at a midway position between a top and a bottom of the sub-tank.

10. A fuel supply device as in claim 1 wherein the sub-tank has two crossing walls to provide the concave space and the fuel level gauge is disposed radially outside of the two crossing walls at a midway position between a top and a bottom of the sub-tank.

11. A fuel supply device for a fuel tank having a mounting hole, the device comprising:
a sub-tank having a concave space on a part of an outer circumferential periphery thereof:
a fuel pump housed within the sub-tank for sucking and discharging fuel in the sub-tank;
a fuel filter housed within the sub-tank together with the fuel pump for filtering out foreign particles from the discharged fuel, the fuel filter being arranged around an outer circumferential periphery of the fuel pump;
a fuel level gauge disposed in the concave space of the sub-tank outside the sub-tank and having an arm extending radially outside the extended outer circumferential periphery of the sub-tank, an electrical connector;
a flange having a larger diameter than the sub-tank and movably engaged with the sub-tank;
a spring disposed between the flange and the sub-tank for biasing the sub-tank away from the flange so that the sub-tank is maintained seated on a bottom of the fuel tank, and a fuel return port held in fluid communication with the fuel pump;
an electrical connector;
and a fuel return port held in fluid communication with the fuel pump, wherein at least one of the electrical connector and fuel return port are disposed axially above the concave space of the sub-tank, and
wherein the sub-tank has a flat wall to define the concave space and the fuel level gauge is attached to the flat wall at a midway position between a top and a bottom of the sub-tank.

* * * * *